Patented May 2, 1933

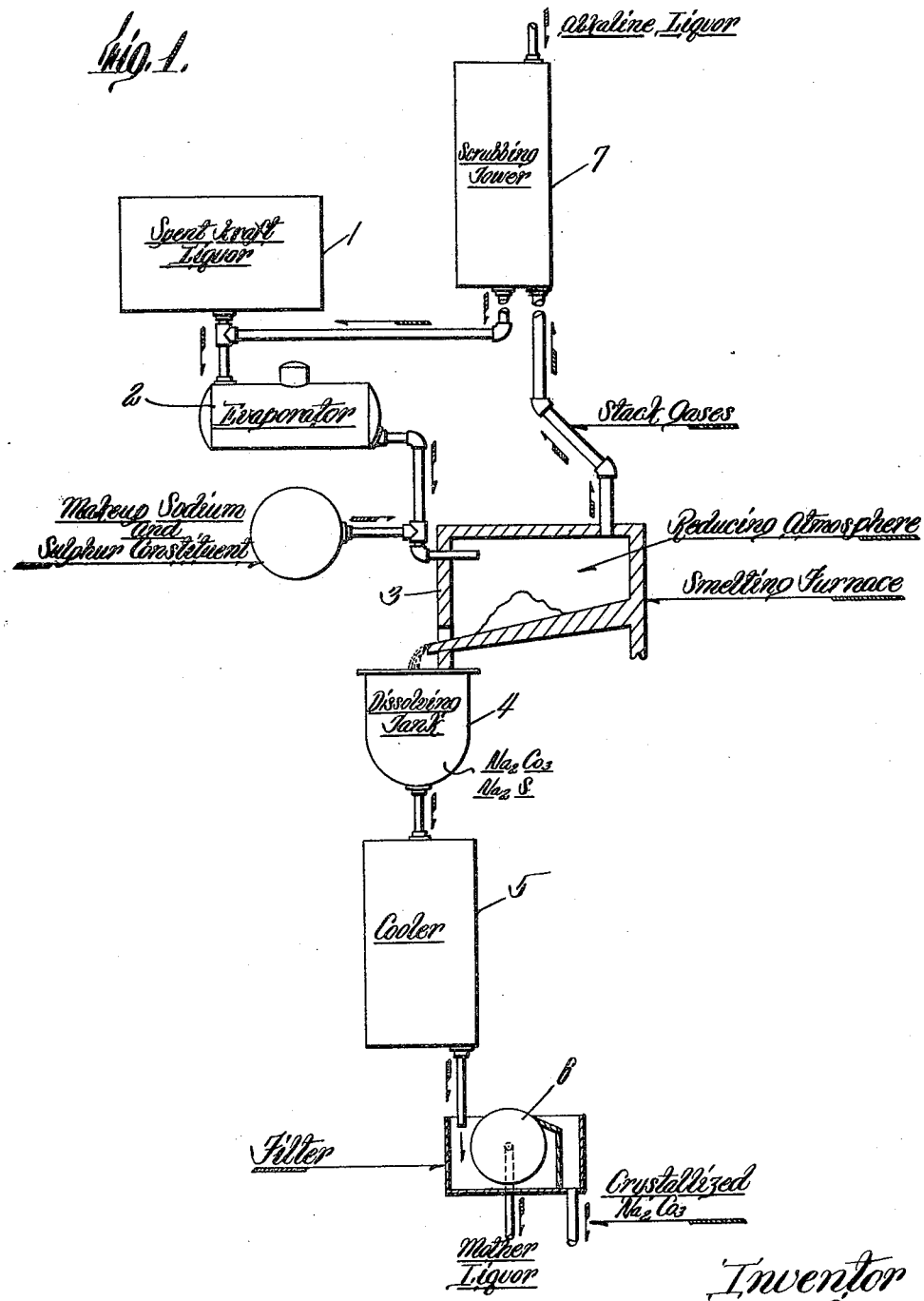

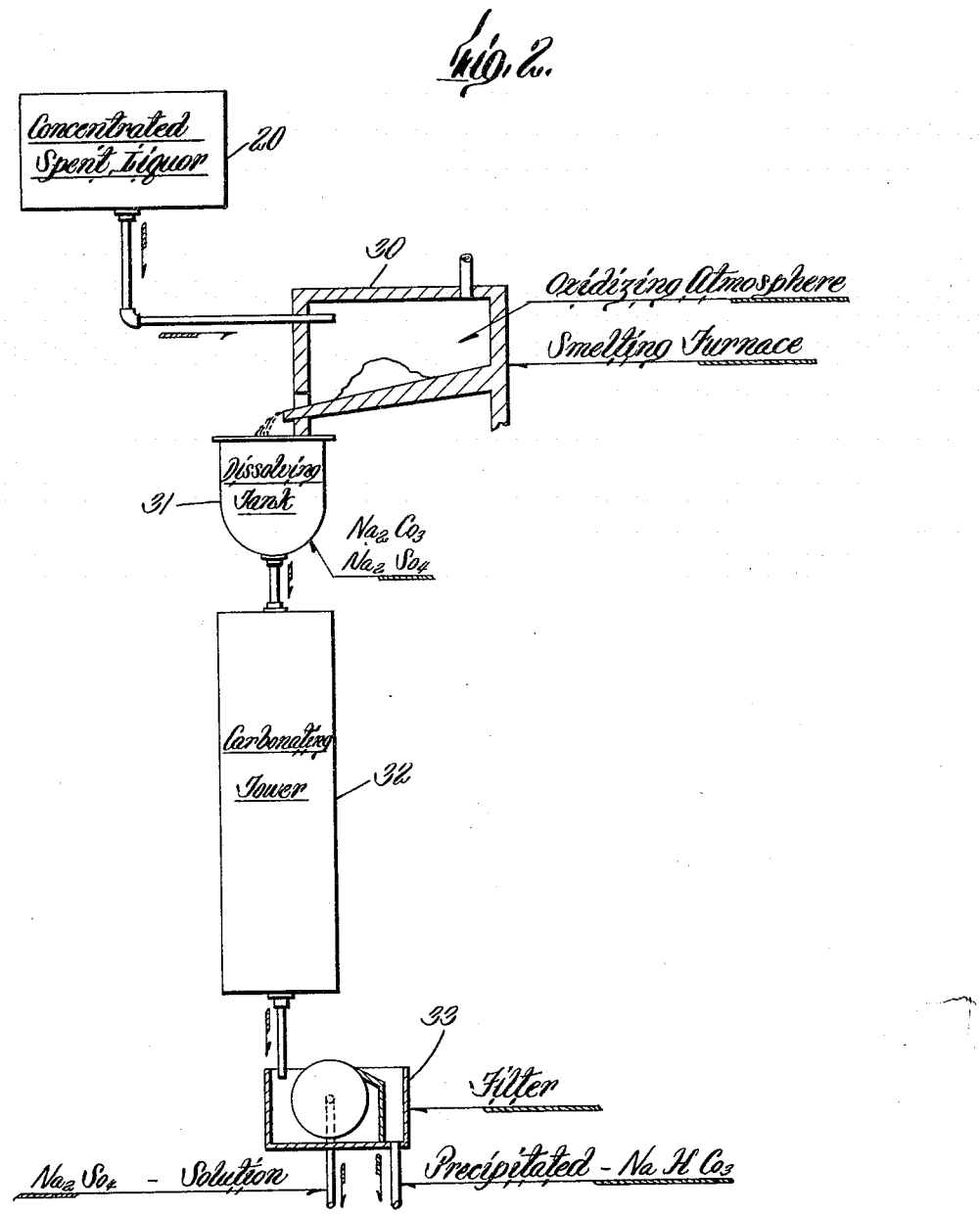

1,906,886

UNITED STATES PATENT OFFICE

GEORGE A. RICHTER, OF BERLIN, NEW HAMPSHIRE, ASSIGNOR TO BROWN COMPANY, OF BERLIN, NEW HAMPSHIRE, A CORPORATION OF MAINE

PROCESS OF RECOVERING AND UTILIZING THE VALUABLE COMPOUNDS IN SPENT COOKING LIQUORS

Application filed November 23, 1927. Serial No. 235,335.

This invention relates to a process of recovering and utilizing valuable compounds in spent cooking liquors, and more especially liquors of the class containing sodium-sulphur compounds.

Various liquors of both acid and alkaline character containing sodium-sulphur compounds as the fiber-liberating agents have been proposed and are now being utilized for the production of pulp from raw cellulosic materials, a typical alkaline liquor of this class being kraft or sulphate liquor, so called, and a typical acid liquor being sodium bisulphite liquor. Where such cooking liquors are employed, it is usual to recover the valuable compounds present in the spent liquor, not only because the fiber-liberating process is thereby rendered commercially feasible, but also because legislation is constantly increasing against water pollution resulting from the discharge of such liquors. Usual recovery practice involves concentrating the spent liquor resulting from digestion, then burning the combustible and smelting the inorganic content of the concentrated liquor, recovering the smelt in water, and converting the smelt solution to a fresh cooking liquor. When the inorganic content of spent liquors containing sodium-sulphur compounds is smelted, a smelt consisting of a mixture of essentially only two sodium compounds is produced, one being sodium carbonate, and the other being a sodium-sulphur salt. Thus, if the smelting takes place in a reducing atmosphere, a smelt containing sodium carbonate and sodium sulphide results; but if the smelting takes place in an oxidizing atmosphere, a smelt containing sodium carbonate and sodium sulphate results.

I have found that it is often advantageous to remove sodium carbonate from the rest of the smelt before preparing fresh cooking liquors. In accordance with the present invention, the removal of sodium carbonate from the rest of the smelt is effected either by taking advantage of the difference in solubility between the sodium carbonate and the rest of the smelt, or by converting it into the relatively insoluble bicarbonate. Thus, if the smelt has been produced in a reducing atmosphere and contains sodium carbonate and sodium sulphide, separation of sodium carbonate may be effected by taking advantage of the marked difference in water solubility between sodium carbonate and sodium sulphide, the sodium sulphide being quite soluble even under conditions when sodium carbonate is relatively quite insoluble and crystallizes out of solution. If the smelt has been produced in an oxidizing atmosphere and contains sodium sulphate rather than sodium sulphide, separation of a substantial amount of the sodium carbonate may be effected by crystallizing it out of the solution while permitting most of the sodium sulphate to remain in solution. Or the smelt solution may be carbonated to convert a portion or all of the sodium carbonate into insoluble bicarbonate and the insoluble bicarbonate removed.

I do not, however, herein claim specifically that phase of my invention involving smelting in an oxidizing atmosphere, as this subject matter is embraced in my divisional Patent No. 1,815,328, issued July 21, 1931.

The removal of sodium carbonate from the rest of the smelt prior to the preparation of fresh cooking liquors of various compositions finds many advantageous applications. For instance, in the production of kraft or sulphate pulp, so called, it is advantageous to employ a cooking liquor of high sulphidity*, as the higher the sulphidity, the higher the yield and the stronger and more bleachable the resulting pulp. It is not known precisely what part sulphidity plays in bringing about these favorable results, but it is usually assumed that sodium sulphide causes less hydrolysis of the cellulose than caustic soda and at the same time exerts a better solvent action upon the ligneous and resinous components of wood.

It has heretofore been difficult to maintain high sulphidity in the cooking liquor, owing to the conditions under which the inorganic content of the spent liquor and make-up compounds are smelted for recovery. Thus, in

---

* The term "sulphidity" denotes the ratio between alkali in the form of sodium sulphide, and total alkali.

the usual process, the inorganic content of concentrated spent liquor, together with make-up quantities of sodium sulphate, are smelted in a reducing atmosphere so as to produce a smelted residuum as high in sulphide as possible. A considerable proportion of the sodium sulphide which theoretically should result, however, decomposes into sodium carbonate and sulphur dioxide, the sodium carbonate largely remaining in the smelted residuum and the sulphur dioxide passing out with the stack gases. Even though sodium and sulphur constituents be smelted in chemically equivalent proportions, the smelted residuum contains a large porportion of sodium carbonate, which necessitates lime for conversion into caustic soda, in producing the cooking liquor.

Attempts have already been made to increase the sulphidity of kraft cooking liquors. For example, in Patent No. 1,469,960, granted October 9, 1923, to Douglas H. McMurtrie and myself, this is described as being accomplished by smelting free sulphur along with the inorganic content of the concentrated spent liquor and make-up amounts of sodium carbonate or sodium sulphate. Even though the sulphur thus added be somewhat in excess of that necessary to combine with the sodium constituent as sulphide, the resulting smelt still contains considerable carbonate; but it is uneconomical to add sulphur to produce sulphidity of smelt in excess of about 40%, owing to the large proportion of sulphur which goes off with the stack gases mainly as sulphur dioxide.

The present invention may be applied to yield cooking liquors of high sulphidity, suitable for kraft digestion, in a simple and economical way, from any spent liquors or mixtures of liquors containing sodium-sulphur compounds, for example spent kraft or sulphite liquors or mixtures thereof. In accordance with my invention, sodium carbonate is separated in desired amount or proportion from the smelt, and the rest of the smelt is then preferably causticized, if any appreciable sodium carbonate remains, and used for the production of fresh alkaline cooking liquor. Inasmuch as the quantity of sodium carbonate to be causticized is reduced, my process thus makes possible an economy in lime equivalent to the amount of sodium carbonate separated from the smelt.

By one method of procedure according to my invention, I produce a smelt solution supersaturated with respect to sodium carbonate but unsaturated with respect to sodium sulphide, and crystallize out sodium carbonate while permitting substantially all the sodium sulphide to remain in solution. This may be accomplished in various ways, as, for example, by delivering the hot smelt into a body of water sufficient to maintain substantially all the sodium sulphide in solution but insufficient to dissolve all or a major portion of the sodium carbonate. The sodium carbonate which thus crystallizes out may be allowed to settle and may then be removed from the concentrated mother liquor containing but a relatively small amount or traces of sodium sulphide. Or the hot smelt may be delivered into sufficient water to maintain all the sodium sulphide and sodium carbonate in solution only while hot, and then cooling the solution to a temperature at which sodium carbonate crystallizes out, leaving a mother liquor of high sulphidity. After removing the crystallized sodium carbonate, the mother liquor may then be treated to causticize the contained or residual sodium carbonate, and then be used for the production of fresh cooking liquor.

Where a cyclic process of fiber liberation and chemical recovery is indefinitely repeated, it is necessary to introduce sufficient sodium and sulphur constituents into the system not only to make up losses but also to compensate for subsequent removal of sodium carbonate from the smelt. For this purpose, the removed sodium carbonate together with free sulphur may be used as raw materials in the smelting furnace, along with sufficient other suitable sodium-and-sulphur-bearing chemicals to yield the amount of sodium sulphide required for cooking. Or sodium sulphate alone may be used as the sodium-and-sulphur-bearing raw material, in which case my process yields sodium carbonate as a by-product. Or caustic soda may be added to the regenerated or fresh cooking liquor, and sulphur introduced into the smelting furnace or into the concentrated spent liquor being delivered thereinto. On the accompanying drawings, Figure 1 illustrates diagrammatically and conventionally certain instrumentalities which may be employed when smelting is effected in a reducing atmosphere.

Figure 2 illustrates in a similar way certain instrumentalities which may be employed when smelting is effected in an oxidizing atmosphere.

Although not limited thereto, the present invention will now be described in greater detail as applied to a kraft mill alone. Referring to Fig. 1, 1 represents a tank containing spent liquor recovered from kraft digestion. Inasmuch as the liquor is too dilute to permit economical smelting of its inorganic content, it is delivered to an evaporator 2, which removes a portion of its aqueous content, producing a liquor having a solids concentration of, say, 50%. The concentrated liquor is then fed into a smelting furnace 3, which may be of the type disclosed in Patent No. 1,326,414, to Hugh K. Moore and John T. Quinn, wherein its organic content is burned and its inorganic content smelted in a reducing atmosphere to produce a smelted residuum consisting of sodium carbonate, sodium sulphide, and but an adventitious amount of sodium sulphate. During smelting, a considerable amount of sulphur constituent is liberated, mainly as sulphur dioxide, so that the resulting smelt in ordinary operation will not be of high sulphidity, usually being of a 25% to 35% sulphidity. The hot smelt is run into a body of water maintained in a dissolving tank 4 to produce a hot smelt solution. In accordance with the process of the present invention, only sufficient water may be used in the tank 4 to dissolve substantially all the sodium sulphide but not all or a major portion of the sodium carbonate, so that the latter will crystallize out, leaving a mother liquor of high sulphidity; or, as illustrated on the drawing, sufficient water may be used in the tank 4 to keep both the sodium carbonate and sodium sulphide in solution at the elevated temperature produced by the hot smelt, and the solution then passed through a cooler 5 which reduces its temperature sufficiently to cause a considerable portion of the sodium carbonate to crystallize out, substantially all the sodium sulphide remaining in solution owing to its extremely high solubility even at the lower temperature produced. Assuming a hot smelt solution at boiling temperature and containing 28% to 32% total alkali of which approximately 70% is sodium carbonate and 30% sodium sulphide, if the solution is cooled down to 30° to 20° C., an amount of sodium carbonate will have crystallized out to increase the sulphidity of the mother liquor to 50%. By maintaining a sulphidity of 50% in kraft cooking liquor, one may secure good results in respect of yield and quality of resulting pulp, but where an even greater sulphidity is desired, this may be obtained quite easily by my process, as by cooling the smelt solution to a lower temperature, say, 10° C., in which case the mother liquor is increased in sulphidity to 80% to 90%. After cooling, the crystallized sodium carbonate is removed from the mother liquor, removal as shown on the drawings being effected by passing the liquor into a rotary filter 7. The mother liquor is then causticized and used in the production of fresh alkaline cooking liquor. In some cases, it may be preferable to cool only a portion of the smelt solution, to crystallize out sodium carbonate, and then mix the resulting high sulphidity mother liquor with the remaining portion of uncooled smelt solution, thus conserving a portion of the heat of the original smelt solution, which is usually at a temperature of 90° C., for subsequent digestion.

To compensate for the sodium and sulphur constituent continuously being lost and leaving the system in the stack gases or as sodium carbonate, sodium and sulphur constituent may be fed along with the concentrated spent kraft liquor into the smelting furnace. The sodium carbonate leaving the system together with its chemical equivalent of free sulphur may be used for this purpose. Where not thus used, sodium sulphate for instance being used as the only raw material, it constitutes a by-product. If a sodium base sulphite mill or a soda mill is being operated simultaneously with the kraft mill, the sodium carbonate may be used to advantage as a raw material for these mills.

It may be desired to recover the valuable compounds present in the stack gases and existing in the form of sublimed sodium or sodium-sulphur compounds and in the form of sulphur dioxide. This may be accomplished as disclosed and claimed in my application, Serial No. 73,194, filed December 4, 1925, by passing an alkaline liquor in contact with and in countercurrent flow to the gases. As shown in the drawings the stack gases pass upwardly through a scrubbing tower 8, which may be filled with inert interstitial material and into which alkaline liquor may be sprayed downwardly in contact with the gases. In the present process, this alkaline liquor may be advantageously prepared from the sodium carbonate separated from the smelt solution. The liquor passing out of the bottom of the tower may be concentrated and fed along with the concentrated spent liquor into the smelting furnace. In some cases, it may be preferable to add sufficient sodium carbonate or other alkali to the liquor passing out of the bottom of the scrubbing tower to react with the acid stack gases and to recirculate such liquor through the tower, and to continue such addition and recirculation until the liquor becomes substantially saturated with salts. The saturated liquor will leave the tower at a temperature of about 60° to 80° C., whereupon a portion or all of such liquor may be cooled to cause sodium sulphate and/or sodium sulphite to crystallize out. The crystallized salts may be removed from the mother liquor and added to the concentrated spent liquor going to the smelting furnace, and the mother liquor may be refortified with alkali and recirculated through the scrubbing tower as previously. Such procedure hence avoids the necessity of concentrating the effluent from the scrubbing tower.

If a kraft mill and a sodium base sulphite mill are being operated simultaneously, my invention may be applied to great advantage. In such case, the acid cooking liquor for the sulphite mill may consist of a sulphurous acid solution of sodium bisulphite and/or sodium sulphate. The spent liquor resulting from such cooking may first be neutralized, then concentrated and its organic content burned and its inorganic content smelted in a reducing atmosphere, thereby producing a smelt containing sodium carbonate and sodium sulphide. By selectively crystallizing and removing sodium carbonate from the smelt solution as hereinbefore described, the mother liquor may be increased to a sulphidity advantageous for kraft digestion, whereupon it may be delivered to the kraft mill and mixed with the high sulphidity mother liquor resulting from the selective crystallization and removal of sodium carbonate from that smelt solution, as hereinbefore described, the mixture of mother liquors being causticized and employed for kraft cooking. The sodium carbonate crystallized and removed from both mother liquors may be converted into a sulphurous acid solution of sodium sulphite and/or sulphate, after compensating for losses by the addition of suitable sodium compounds, e. g., sodium carbonate or sodium sulphate, and used for acid cooking of raw cellulosic material in the sulphite mill. In such case, my invention further makes possible the use of only one furnace, in lieu of a separate smelting furnace for each mill. Thus, the spent liquor resulting from kraft digestion and that resulting from acid digestion in a solution of sodium sulphur compounds may be mixed either before or after concentration, the inorganic content of the mixture smelted in a reducing atmosphere, a smelt solution produced, sodium carbonate selectively crystallized from the smelt solution and used for the preparation of an acid cooking liquor, while the mother liquor is causticized and used for alkaline cooking.

My invention may also be applied, if it is desired to cook raw cellulosic materials in a liquor containing sodium sulphite and sodium sulphide. Thus, the spent liquor resulting from digestion is concentrated, and its inorganic content burned in a reducing atmosphere to produce a smelt containing sodium carbonate and sodium sulphide, as previously. Sodium carbonate is selectively crystallized and removed from the smelt solution, then converted into sodium sulphite which is mixed with the mother liquor, the latter preferably being causticized before such mixing.

As hereinbefore described, the present invention may also be applied if the smelting of the inorganic content of spent liquors containing sodium-sulphur compounds takes place in an oxidizing atmosphere, Figure 2 of the accompanying drawings illustrating certain of the instrumentalities which may be employed for this purpose. Referring to this figure, 20 represents a storage tank containing the concentrated spent liquor, which may, for example, be concentrated spent kraft liquor, sulphite liquor, or mixtures thereof. The liquor is fed into a smelting furnace 30, in an oxidizing atmosphere is maintained so as to produce a smelt containing sodium sulphate and sodium carbonate. The smelt is run into a body of water maintained in a dissolving tank 31 to form an aqueous smelt solution.

A substantial amount of sodium carbonate may then be crystallized out of the smelt solution while permitting most of the sodium sulphate to remain in solution. Thus, a smelt solution comprising 29 parts of sodium carbonate and 13 parts of sodium sulphate at a temperature of, say, 30° C., may be cooled to, say, 20° C., to form a crystalline precipitate of sodium carbonate containing but a relatively very small amount of sodium sulphate. After the removal of the crystalline material, the mother liquor contains 16 parts of sodium carbonate and 12 parts of sodium sulphate, indicating a substantial removal of sodium carbonate and a relatively low removal of sodium sulphate. Or I may deliver the smelt solution or mother liquor into a carbonating tower 32, as shown, wherein it is treated with carbon dioxide, thereby precipitating the relatively insoluble sodium bicarbonate. The precipitated sodium bicarbonate may be removed as by passing the solution and precipitate into a rotary filter 33. The removed sodium carbonate or bicarbonate may be acidified to produce an acid sulphite cooking liquor, while the sodium sulphate-containing mother liquor may be delivered to a kraft mill to replace the salt-cake ordinarily there employed to compensate for losses. Or only a portion of the mother liquor may be used for this purpose in a kraft mill, the rest being mixed with the sodium bicarbonate and the mixture acidified with sulphur dioxide to produce an acid cooking liquor wherein the ratio of sulphite to sulphate is higher than would be the case if the smelt solution were acidified without previous separation of bicarbonate. During acidification of the bicarbonate to produce sodium sulphite, carbon dioxide is liberated. This carbon dioxide may be recovered and used for the carbonation of other smelt solutions.

Having thus described certain embodiments of this invention, it is evident to those skilled in the art that various changes and modifications might be made therein without departing from the spirit or scope of invention as defined in the appended claims.

What I claim is:

1. A process which comprises smelting the inorganic content of spent cooking liquor containing only sodium compounds, including sodium-sulphur compounds to produce a completely water-soluble smelt containing sodium carbonate as one of its components, dissolving the smelt in water, and crystallizing out and removing sodium carbonate from the rest of the components in solution.

2. A process which comprises smelting the inorganic content of spent cooking liquor containing only sodium compounds, including sodium-sulphur compounds to produce a completely water-soluble smelt containing sodium carbonate as one of its components, dissolving the smelt in water, crystallizing out and removing sodium carbonate from the rest of the components in solution, and using the rest of the components in solution for the production of fresh alkaline cooking liquor.

3. A process which comprises smelting the inorganic content of spent cooking liquor containing sodium-sulphur compounds in a reducing atmosphere to produce a smelt containing sodium carbonate and sodium sulphide, removing sodium carbonate from the smelt, and using the rest of the smelt for the production of an alkaline cooking liquor.

4. A process which comprises smelting the inorganic content of spent cooking liquor containing sodium-sulphur compounds in a reducing atmosphere to produce a smelt containing sodium carbonate and sodium sulphide, removing a portion of sodium carbonate from the smelt, causticizing the rest of the smelt, and using the causticized smelt for the production of an alkaline cooking liquor.

5. A process which comprises smelting the inorganic content of spent cooking liquor containing sodium-sulphur compounds in a reducing atmosphere to produce a smelt containing sodium carbonate and sodium sulphide, producing an aqueous smelt solution super-saturated with respect to sodium carbonate but unsaturated with respect to sodium sulphide and crystallizing out sodium carbonate while permitting sodium sulphide to remain in solution, removing the crystallized sodium carbonate from its mother liquor, and using the mother liquor for the production of an alkaline cooking liquor.

6. A process which comprises smelting the inorganic content of spent cooking liquor containing sodium-sulphur compounds in a reducing atmosphere to produce a smelt containing sodium carbonate and sodium sulphide, forming an aqueous smelt solution, and crystallizing out sodium carbonate while permitting sodium sulphide to remain in solution.

7. A process which comprises smelting the inorganic content of spent cooking liquor containing sodium-sulphur compounds in a reducing atmosphere to produce a smelt containing sodium carbonate and sodium sulphide, forming an aqueous smelt solution, crystallizing out sodium carbonate while permitting sodium sulphide to remain in solution, removing the crystallized sodium carbonate from its mother liquor, and using the mother liquor for the production of an alkaline cooking liquor.

8. A process which comprises smelting the inorganic content of spent cooking liquor containing sodium-sulphur compounds in a reducing atmosphere to produce a smelt containing sodium carbonate and sodium sulphide, delivering the resulting hot smelt into sufficient water to maintain all the sodium carbonate and sodium sulphide in solution only while hot, cooling the solution to a temperature at which sodium carbonate crystallizes out, removing the crystallized sodium carbonate from its mother liquor, and using the mother liquor for the production of an alkaline cooking liquor.

9. A process which comprises smelting the inorganic content of spent kraft cooking liquor in a reducing atmosphere to produce a smelt containing sodium carbonate and sodium sulphide of about 25% to 35% sulphidity, delivering the resulting hot smelt into sufficient water to maintain all the smelt in solution only while hot, cooling the solution to a temperature at which sufficient sodium carbonate crystallizes out to produce a mother liquor of at least 50% sulphidity, removing the crystallized sodium carbonate from its mother liquor, and using the mother liquor for the production of fresh kraft cooking liquor.

10. A process which comprises smelting the inorganic content of spent kraft cooking liquor in a reducing atmosphere to produce a smelt containing sodium carbonate and sodium sulphide, removing sodium carbonate from the smelt, and smelting the separated sodium carbonate together with free sulphur and the inorganic content of other spent kraft cooking liquor while producing another smelt.

11. A process of cooperatively combining the recovery operations of chemical pulp mills in which acid sulphite and alkaline sodium-base liquors are employed, which comprises mixing spent acid sulphate liquors and spent alkaline cooking liquors to produce a mixture containing sodium-sulphur compounds, smelting the inorganic content of the mixture to produce a completely water soluble smelt containing sodium carbonate as one of its components, dissolving the smelt in water, crystallizing out and removing sodium carbonate from the rest of the components in solution, using such sodium carbonate for the production of an acid sulphite cooking liquor, and using the rest of the components in solution for the production of an alkaline cooking liquor.

12. A process of cooperatively combining the recovery operations of chemical pulp mills in which acid sulphite and alkaline sodium-base liquors are employed, which comprises mixing spent acid sulphate liquors and spent alkaline cooking liquors to produce a mixture containing sodium-sulphur compounds, smelting the inorganic content of the mixture in a reducing atmosphere to produce a smelt containing sodium carbonate and sodium sulphide, dissolving the smelt in water, selectively crystallizing out and removing sodium carbonate from the rest of the smelt in solution, using the crystallized sodium carbonate for the production of an acid sulphite cooking liquor, and using the rest of the smelt solution for the production of an alkaline cooking liquor.

13. A process which comprises smelting the inorganic content of spent cooking liquor containing sodium-sulphur compounds in a reducing atmosphere to produce a smelt containing sodium carbonate and sodium sulphide, forming an aqueous smelt solution, selectively crystallizing and removing sodium carbonate from the dissolved mixture, converting such sodium carbonate into sodium sulphite, mixing sodium sulphite with the mother liquor from which crystallization took place, and using the mixture for the production of cooking liquor.

In testimony whereof I have affixed my signature.

GEORGE A. RICHTER.